United States Patent [19]
Konno et al.

[11] Patent Number: 6,090,886
[45] Date of Patent: *Jul. 18, 2000

[54] FINELY DISPERSED POLYURETHANE POLYUREA CROSSLINKED PARTICLES AND PROCESS FOR PRODUCING THE SAME

[75] Inventors: Hidetoshi Konno; Mitsuo Kase; Ichiro Muramatsu; Noboru Okoshi, all of Chiba, Japan

[73] Assignee: Dainippon Ink & Chemicals, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/599,976

[22] Filed: Feb. 14, 1996

[51] Int. Cl.⁷ ...................................................... C08G 18/34
[52] U.S. Cl. .......................... 524/839; 524/819; 524/840; 528/71
[58] Field of Search .............................. 528/71; 524/819, 524/840, 839

[56] References Cited

U.S. PATENT DOCUMENTS 4,147,679  4/1979  Scriven ..................................... 428/262

*Primary Examiner*—Rachel Gorr
*Attorney, Agent, or Firm*—Armstrong, Westerman, Hattori, McLeland & Naughton

[57] ABSTRACT

Finely dispersed polyurethane polyurea crosslinked particles having an average particle diameter of not greater than 1 μm and essentially comprising (A) an ion-forming polyol, (B) a polyisocyanate, and (C) a polyamine; and a process for producing the same are disclosed. The present invention provides finely dispersed polyurethane polyurea crosslinked particles and a process for producing the same; the dispersed particles being firmly crosslinked and having an average particle diameter of not greater than 1 μm, and the particle dispersion having high preservation stability, preventing the core substance, if encapsulated therein, from undergoing denaturation, and exhibiting per se film-forming properties to provide a film excellent in water resistance, solvent resistance and chemical resistance.

13 Claims, No Drawings

FINELY DISPERSED POLYURETHANE POLYUREA CROSSLINKED PARTICLES AND PROCESS FOR PRODUCING THE SAME

FIELD OF THE INVENTION

The present invention relates to novel and useful finely dispersed polyurethane polyurea crosslinked particles and to a process for producing the same. The finely dispersed polyurethane polyurea crosslinked particles of the present invention are fine particles having an average particle diameter of not greater than 1 μm. The particles are stable in a disperse medium such as water, and the dispersion has film-forming properties by itself to provide a film excellent in chemical resistance and water resistance. Besides having satisfactory mechanical properties, the film formed from the particles exhibits excellent resistance against water and organic solvents, such as acetone.

In particular, since the finely dispersed particles of the invention can have various core substances encapsulated therein easily and stably, there are provided finely dispersed polyurethane polyurea crosslinked particles useful in various fields as coatings, inks, adhesives, fiber treating agents, and the like.

BACKGROUND OF THE INVENTION

An aqueous dispersion of urethane fine particles, such as polyurethane polyurea particles, has been prepared mostly by dispersing an isocyanate-terminated isocyanate prepolymer in water and adding a polyamine, etc. to the dispersion to increase the molecular chain length as described in JP-A-48-51949 (the term "JP-A" as used herein means an "unexamined published Japanese patent application"), JP-A-62-67003, JP-A-62-149333, and JP-B-63-58610 (the term "JP-B" as used herein means an "examined Japanese patent publication").

However, it has been difficult to obtain a film having satisfactory properties from the urethane fine particles obtained by these conventional techniques due to the poor solvent resistance of the film formed.

In order to improve solvent resistance it has been proposed to use a combination of an isocyanate prepolymer having self-dispersibility and a polyisocyanate having a functionality of 2.1 to 4 as disclosed in U.S. Pat. No. 4,507,431 and JP-A-3-128912.

Although the above process is advantageous for obtaining finely dispersed crosslinked polymer particles capable of forming a solvent-resistant film, it encountered difficulty in preparing finely dispersed particles having encapsulated therein a core substance, such as a pigment, in a stable manner because the isocyanate prepolymer or the 2.1 to 4-functional polyisocyanate often tends to react with the water content present in the core substance to cause such an unfavorable phenomenon as viscosity increase and relation.

SUMMARY OF THE INVENTION

The inventors of the present invention have conducted extensive study on the above subject matter. As a result, they have found that, when a tri- or more functional ion-forming polyol and/or a tri- or more functional polyisocyanate and a polyamine are used, an interfacial polyaddition polycondensation reaction proceeds at the shell of finely dispersed particles, and a urethanization reaction proceeds in the inside of the fine particles thereby to provide finely dispersed polyurethane polyurea particles having a firmly crosslinked structure and an average particle diameter of not greater than 1 μm. The present invention has been completed based on this finding.

The present invention relates to finely dispersed polyurethane polyurea crosslinked particles having an average particle diameter of not greater than 1 μm and essentially comprising (A) an ion-forming polyol, (B) a polyisocyanate, and (C) a polyamine.

More specifically, the invention includes finely dispersed polyurethane polyurea crosslinked particles characterized by having an average particle diameter of 0.01 to 0.5 μm; those characterized by having encapsulated therein a core substance; those characterized in that the ion-forming polyol (A) is a polyester polyol or polyurethane polyol having a number-average molecular weight of 500 to 10,000; and those characterized in that the polyisocyanate (B) is an aliphatic and/or alicyclic polyisocyanate having a number-average molecular weight of 100 to 2,000.

The present invention also relates to a process for producing finely dispersed polyurethane polyurea crosslinked particles which comprises the steps of:

(a) mixing (A) an ion-forming polyol and (B) a polyisocyanate to prepare an organic phase, the isocyanate group of (B) being in stoichiometrical excess over the hydroxyl group of (A);

(b) dispersing the organic phase in an aqueous phase to form a dispersed layer; and (c) adding (C) a polyamine to the dispersed layer and dispersing to react.

More specifically, the invention includes a process for producing finely dispersed polyurethane polyurea crosslinked particles characterized in that at least 0.1 mol % of the total of the ion-forming polyol (A) and the polyisocyanate (B) consists of a tri- or more functional polyol and/or a tri- or more functional polyisocyanate; the one characterized in that the organic phase is prepared by mixing the ion-forming polyol (A) and the polyisocyanate (B) in the presence of an inert organic solvent; the one characterized in that the organic phase is prepared by mixing the ion-forming polyol (A) and the polyisocyanate (B) in the presence of an organometallic catalyst; the one characterized in that the ion-forming polyol (A) contains a core substance; the one characterized in that the ion-forming polyol (A) has a carboxyl group in the molecule thereof; the one characterized in that the equivalent ratio of the ion-forming polyol (A) to the polyisocyanate (B) ranges from 0.1:1 to 0.9:1; the one characterized in that the ion-forming polyol (A) contains a carboxyl group in the molecule thereof and the equivalent ratio of the ion-forming polyol (A) to the polyisocyanate (B) ranges from 0.1:1 to 0.9:1; the one characterized in that the equivalent ratio of the polyamine (C) to the excess isocyanate group present in the organic phase is 0.2 to 1.0; and the one characterized in that the ion-forming polyol (A) containing a carboxyl group in the molecule thereof is in the form of a salt based on the carboxyl group neutralized with a base, such as an amine or ammonia.

The present invention additionally relates to finely dispersed polyurethane polyurea crosslinked particles having an average particle diameter of not greater than 1 μm which are prepared by the above-identified process and the embodiments thereof, and more specifically, those having an average particle diameter of 0.01 to 0.5 μm; and those having encapsulated therein a core substance.

DETAILED DESCRIPTION OF THE INVENTION

The present invention will be described below in detail.

The ion-forming polyol as component (A) is a polyol having (i) a group capable of forming an ion in the presence of a counter ion to exhibit hydrophilic properties and (ii) a hydroxyl group reactive with a polyisocyanate. For example, ion-forming polyol (A) includes those having a carboxyl group in the molecule thereof, the carboxyl group being capable of being neutralized with a base, e.g., an amine or ammonia, to form a salt.

The group capable of forming an ion in the presence of a counter ion to exhibit hydrophilic properties includes a carboxyl group, a sulfonic acid group, a phosphoric ester group, and a tertiary amino group. The most preferred of them is a carboxyl group for its manageability in providing fine particles with well-balanced performance properties. A carboxyl group can be introduced into a polyol and neutralized with a base, such as an amine, to form a salt with hydrophilic properties.

Ion-forming polyol (A) undergoes reaction with the isocyanate group in polyisocyanate (B), the other component constituting the particles, whereupon crosslinking proceeds in the inside of the particles to bring about further improvements in mechanical properties of the particles. In this aspect ion-forming polyol (A) is a very important component.

Such ion-forming polyol (A) per se is not novel. Any known polyols containing an ion-forming functional group (e.g., a carboxyl group) in the molecule thereof can be used. Typical illustrative examples of ion-forming polyol (A) include (a) a polyurethane polyol, (b) an acrylic polyol, (c) a polyester polyol, (d) a lactone-modified polyester polyol, (e) a polyester amide polyol, (f) an alkyd polyol, (g) a polyether polyol, (h) a modified polyether polyol, (i) a polythioether polyol, (j) a polycarbonate polyol, (k) a polyacetal polyol, (l) a polyolefin polyol, (m) an epoxy-modified polyol, (n) a silicone polyol, and (o) a fluoro-carbon polyol, each of which contains a carboxyl group in the molecule thereof.

Polyurethane polyol (a) includes a carboxyl-containing compound obtained by reacting at least one of polyhydric alcohols (e.g., ethylene glycol, propylene glycol, 1,3-propanediol, 1,4-butanediol, 1,3-butanediol, 1,5-pentanediol, neopentyl glycol, 1,6-hexanediol, 1,4-bis (hydroxymethyl)cyclohexane, bisphenol A, hydrogenated bisphenol A, hydroxypivalyl hydroxy pivalate, trimethylolethane, trimethylolpropane, 2,2,4-trimethyl-1,3-pentanediol, glycerin, and hexanetriol) and/or the above-mentioned various polyols, at least one of polyisocyanates hereinafter described, and a carboxyl-containing diol (e.g., dimethylolpropionic acid).

Trifunctional or more functional polyurethane polyols are obtained by addition reaction of the above-mentioned diol to a tri- or more functional polyisocyanate or by addition reaction of the above-mentioned triol to a diisocyanate compound.

Acrylic polyol (b) includes a carboxyl-containing compound obtained by copolymerizing a hydroxyl-containing acrylic monomer (e.g., β-hydroxyethyl methacrylate, β-hydroxypropyl methacrylate, β-hydroxyethyl acrylate, and β-hydroxypropyl acrylate), a carboxyl-containing monomer (e.g., acrylic acid, methacrylic acid, maleic acid and itaconic acid), and other acrylic monomers copolymerizable with these monomers.

Trifunctional or more functional acrylic polyols are obtained by copolymerizing the hydroxyl-containing acrylic monomer and other acrylic monomers so that the copolymer may contain 3 or more units derived from the hydroxyl-containing acrylic monomer per molecule.

Polyester polyol (c) is a polyester polyol having a carboxyl group remaining in the molecule, which is obtained by co-condensation between at least one of the above-mentioned polyhydric alcohols and a polycarboxylic acid. Typical examples of the polycarboxylic acid are succinic acid, adipic acid, sebacic acid, azelaic acid, phthalic acid, tetrahydrophthalic acid, hexahydrophthalic acid, maleic acid, fumaric acid, citraconic acid, itaconic acid, glutaconic acid, 1,2,5-hexatricarboxylic acid, 1,4-cyclohexanedicarboxylic acid, 1,2,4-benzenetricarboxylic acids, 1,2,5-benzenetricarboxylic acid, 1,2,4-cyclohexanetricarboxylic acid, and 2,5,7-naphthalenetricarboxylic acid.

Tri- or more functional polyester polyols are obtained by co-condensation between a triol as polyhydric alcohol and a dicarboxylic acid or between a diol and a tricarboxylic acid as polycarboxylic acids.

Lactone-modified polyester polyol (d) includes a lactone type polyester polyol having a carboxylic group remaining in the molecule, which is obtained by polycondensation between at least one of the polyhydric alcohols and a lactone, such as ε-caprolactone, δ-valerolactone or 3-methyl-δ-valerolactone; and a lactone-modified polyester polyol having a carboxyl group remaining in the molecule, which is obtained by polycondensation between a polyhydric alcohol, a polycarboxylic acid, and the above-described lactone. Tri- or more functional lactone-modified polyester polyols are obtained by co-condensation between a triol as polyhydric alcohol and a lactone.

Polyester amide polyol (e) includes those having a carboxylic group remaining in the molecule, which are obtained by co-condensation of an amino-alcohol, such as ethanolamine, and the above-described starting materials for polyester polyols.

Tri- or more functional polyester amide polyols are obtained by co-condensation between the above-mentioned tri- or more functional polyester polyol and an amino-alcohol.

Alkyd polyol (f) includes those having a carboxyl group remaining in the molecule, which are obtained by esterification of castor oil, a castor oil derivative, hydrogenated castor oil, a hydrogenated castor oil derivative or fat and oil, the above-described polyhydric alcohol, and a polycarboxylic acid. Tri- or more functional alkyd polyols are obtained by esterification using various fats and oils and a triol as polyhydric alcohol or a tricarboxylic acid as polycarboxylic acid.

Polyether polyols (g) include urethenation products obtained from at least one polyether glycol (e.g., polyoxyethylene glycol, polyoxypropylene glycol, polyoxyethylene polyoxytetramethylene glycol, polyoxypropylene polyoxytetramethylene glycol or polyoxyethylene polyoxypropylene polyoxytetramethylene glycol), at least one of the polyisocyanate compounds hereinafter described, and a carboxyl-containing diol (e.g., dimethylolpropionic acid); and esterification products obtained by co-condensation between at least one of the polyether glycols and a polycarboxylic acid. Tri- or more functional polyether polyols are obtained by addition of the polyether glycol to the tri- or more functional polyisocyanate hereinafter described.

Modified polyether polyol (h) includes those having a carboxyl group which are obtained by ring-opening polymerization of the above-described polyhydric alcohol, and ethylene oxide, propylene oxide, tetrahydrofuran, ethyl glycidyl ether, propyl glycidyl ether, butyl glycidyl ether, phenyl glycidyl ether or allyl glycidyl ether, etc., and a carboxyl-containing diol, such as dimethylolpropionic acid.

Tri- or more functional modified polyether polyols are obtained by ring-opening polymerization of ethylene oxide, propylene oxide, tetrahydrofuran, ethyl glycidyl ether, propyl glycidyl ether, butyl glycidyl ether, phenyl glycidyl ether, allyl glycidyl ether, etc. and a triol as polyhydric alcohol.

Polythioether polyol (i) includes polythioethers having a carboxyl group in the molecule thereof which are obtained by condensation of thiodiglycol, and a polyhydric alcohol, a polycarboxylic acid, formaldehyde, an amino-alcohol or an aminocarboxylic acid, and a carboxyl-containing diol, such as dimethylolpropionic acid.

The polythioethers include those having a carboxyl group in the molecule thereof, such as a condensation product of thiodiglycol and dimethylolpropionic acid, and a condensation product of thiodiglycol, dimethylolpropionic acid, and in addition a polyhydric alcohol, a polycarboxylic acid, formaldehyde, an amino-alcohol or an aminocarboxylic acid.

Tri- or more functional polythioether polyols are obtained by co-condensation using a triol as polyhydric alcohol or a tricarboxylic acid as polycarboxylic acid.

Polycarbonate polyol (j) includes a reaction product obtained from a polyhydric alcohol, a carboxyl-containing diol (e.g., dimethylolpropionic acid), and a diaryl carbonate (e.g., diphenyl carbonate) or phosgene. Tri- or more functional polycarbonate polyols are obtained by using a triol as polyhydric alcohol.

Polyacetal polyol (k) includes those obtained by reacting glycol or hexanediol and a carboxyl-containing diol (e.g., dimethylolpropionic acid) with formaldehyde. Polyacetal polyol (k) can also be prepared by polymerization of a cyclic acetal. Tri- or more functional polyacetal polyols are obtained by using a triol.

Polyolefin polyol (l) includes those having a carboxyl group in the molecule thereof which are obtained by copolymerizing a hydroxyl-terminated butadiene homopolymer or copolymer and a carboxyl-containing monomer (e.g., maleic acid or itaconic acid).

Tri- or more functional polyolefin polyols are obtained by introducing at least 3 units of the hydroxyl-containing acrylic monomer per molecule or by addition to a tri- or more functional polyisocyanate hereinafter described.

Epoxy-modified polyester polyol (m) includes those obtained by additionally using an epoxy compound (e.g., bisphenol A type epoxy compound, a hydrogenated bisphenol A type epoxy compound, a glycidyl ether of a monohydric alcohol and/or a polyhydric alcohol, or a glycidyl ester of a monobasic acid and/or a polybasic acid) in the synthesis of the above-described polyester polyols.

Tri- or more functional epoxy-modified polyester polyols are obtained by additionally using at least one of the epoxy compounds in the synthesis of the above-described tri- or more functional polyester polyols.

Silicone polyol (n) is a polyol containing a siloxy bond in the molecule thereof and includes those obtained by using a silicone compound having a reactive group as part of the starting materials for preparing the above-described various polyols. Typical examples of the silicone compound having a reactive group include those having a hydroxyl group, such as X-22-160-AS, X-22-160A, X-22-160B, and X-22-160C (all produced by Shin-Etsu Chemical Co., Ltd.), SH-3746, SF-8428, SH-3771, BY-16-036, BY-16-027, and BY-16-038 (all produced by Dow Corning Toray Silicone Co., Ltd.); those having an amino group, such as X-22-161AS, X-22-161A, X-22-161B, and X-22-161-C (all produced by Shin-Etsu Chemical Co., Ltd.), and BY-16-828, BY-16-850, BY-16-8417, BY-16-849, and BY-16-872 (all produced by Dow Corning Toray Silicone Co., Ltd.); those having a glycidyl group, such as X-22-163AS, X-22-163A, X-22-163B, and X-22-163C (all produced by Shin-Etsu Chemical Co., Ltd.), and SF-8413, SF-8411 (both produced by Dow Corning Toray Silicone Co., Ltd.); those having a vinyl group, such as X-22-164AS, X-22-164A, X-22-164B, and X-22-164C (all produced by Shin-Etsu Chemical Co., Ltd.); and those having a thiol group, such as X-22-167AS, X-22-167A, X-22-167B, and X-22-167C (all produced by Shin-Etsu Chemical Co., Ltd.). Tri- or more functional silicone polyols are obtained by using the reactive silicone compound in the synthesis of the above-described various tri- or more functional polyols.

Fluorocarbon polyol (o) includes those containing a carboxyl group in the molecule thereof obtained by copolymerizing a fluorovinyl monomer (e.g., vinylidene fluoride, tetrafluoroethylene, chlorotrifluoroethylene, hexafluoropropylene, a (per)fluoroalkyl ether having 1 to 18 carbon atoms in its alkyl moiety or a perfluoroalkyl trifluorovinyl ether having 1 to 18 carbon atoms in its alkyl moiety), a hydroxyl-containing vinyl monomer, a carboxyl-containing vinyl monomer, and other vinyl monomers copolymerizable with these monomers.

Tri- or more functional fluorocarbon polyols are obtained by copolymerizing the hydroxyl-containing vinyl monomer and other vinyl monomers so as to introduce at least three units derived from the hydroxyl-containing vinyl monomer per molecule.

These ion-forming polyols (a) to (o) may be used either individually or as a combination of two or more thereof. It is preferred for sufficient crosslinking in the inside of the polymer particles that ion-forming polyol (A) has a number-average molecular weight of 500 to 10,000, still preferably 1,000 to 30,000, particularly 2,000 to 10,000.

Polyol (A) may be used for the reaction in a dissolved and diluted state in an organic solvent. Polyol (A) may be used either with its ion-forming group intact or with its acid radical as ion-forming group, such as a carboxyl group, neutralized with a base, e.g., an amine or ammonia, into a salt form, for example, neutralized with a tertiary amine, e.g., triethylamine, into a quaternary ammonium salt.

Presence of at least one ion-forming group in a polyol makes the polyol dispersible in water in the form of very fine particles. A carboxyl group is a preferred ion-forming group for ease in providing a good balance of various performance properties of the fine particles. In using a carboxyl group as ion-forming group, the solids content of ion-forming polyol (A) preferably has an acid value of 15 to 100, still preferably 20 to 60.

Of the above-described various ion-forming polyols particularly preferred as component (A) are polyester polyols, polyurethane polyols, and hydroxyl-containing vinyl copolymers.

Any known isocyanate compound can be used for constituting the polyisocyanate as component (B). Typical illustrative examples of suitable isocyanate compounds include aromatic di- or triisocyanate monomers, such as tolylene diisocyanate, diphenylmethane-4,4'-diisocyanate, xylylene diisocyanate, naphthalene-1,5-diisocyanate, p-phenylene diisocyanate, dibenzyl diisocyanate, diphenyl ether diisocyanate, m- or p-tetramethylxylylene diisocyanate, and triphenylmethane triisocyanate; and aliphatic or alicyclic diisocyanate monomers, such as hydrogenated tolylene diisocyanate, hydrogenated diphenylmethane-4,4'-diisocyanate, 1,4-tetramethylene diisocyanate, 1,6-hexamethylene diisocyanate, hydrogenated xylylene diisocyanate, cyclohexyl-1,4-diisocyanate, and isophorone diisocyanate. Polyisocyanate (B) is made up of one or more kinds of these isocyanate monomer units, and polyisocyanates (B) may be used either individually or as a combination of two or more thereof.

Polyisocyanate (B) further includes trifunctional or more functional polyisocyanurate type polyisocyanates based on these monomers; various modified polyisocyanates, such as biuret type polyisocyanates; and isocyanate-terminated urethane-modified polyisocyanate prepolymers obtained by urethanization reaction between at least one of the above-enumerated isocyanate monomers and the modified polyisocyanates and at least one polyhydroxy compound, such as the above-described polyhydric alcohols, polyurethane polyols, acrylic polyols, polyester polyols, lactone-modified polyester polyols, polyester amide polyols, alkyd polyols, polyether polyols, modified polyether polyols, polythioether polyols, polycarbonate polyols, polyacetal polyols, polyolefin polyols, epoxy-modified polyols, silicone polyols, and fluorocarbon polyols. These polyisocyanates may be used either individually or as a combination of two or more thereof.

Taking weatherability and mechanical characteristics into consideration, polyisocyanate (B) is preferably selected from those derived from aliphatic and/or alicyclic isocyanate monomers. Additionally taking safety and toxicity in handling into consideration, it is still preferred to select polyisocyanate (B) from among isocyanate-terminated urethane-modified polyisocyanate prepolymers obtained by urethanization of at least one isocyanate monomer and at least one polyhydroxy compound.

Trifunctional or more functional polyisocyanates include tri- or more functional polyisocyanurate type polyisocyanates based on triisocyanate monomers (e.g., triphenylmethane triisocyanate) or the above-enumerated diisocyanate monomers; various modified polyisocyanates, such as allophanate type or biuret type polyisocyanates, which are obtained by addition reaction of the above-described diisocyanate monomer to the active hydrogen of an urethane linkage or urea linkage, respectively, of a urethane compound to give tri- or higher functionality; and tri- or more functional adduct type polyisocyanates obtained by addition reaction of at least one of the above-enumerated triols and tri- or more functional polyols and at least one of the above-enumerated diisocyanate monomers.

In order for the finely dispersed polyurethane polyurea crosslinked particles to have especially excellent toughness, the number-average molecular weight of polyisocyanate (B) preferably ranges from 100 to 2,000, still preferably from 150 to 1,800, particularly preferably from 200 to 1,500.

It is preferable that ion-forming polyol (A) and polyisocyanate (B) are mixed at a hydroxyl equivalent in (A) to isocyanate equivalent in (B) of 0.1:1 to 0.9:1, still preferably 0.1:1 to 0.8:1, particularly preferably 0.2:1 to 0.7:1, so that the (A) and (B) mixture itself may be capable of crosslinking to form a three-dimensional structure. That is, it is required of the mixture to get gelled upon complete urethanization so as not to be dissolved in a solvent.

This condition in designing an organic phase is primary and essential for securing an internal crosslinked structure of the dispersed particles that would not be obtained only by interfacial polycondensation on addition of a polyamine as component (C) hereinafter described. Presence of an excess isocyanate group as specified above is necessary for carrying out the interfacial polymerization with ease. The above equivalent ratio has been specified in order for the shell of fine particles to be formed rapidly.

The present invention is also intended to bring about improvements in toughness of the particles as a whole and in solvent resistance, which could not be attained by the conventional techniques, by causing urethanization to proceed in the inside of particles in a three-dimensional way. To realize such internal three-dimensional urethanization, not all the ion-forming polyol compounds and/or the polyisocyanate compounds need to have tri- or higher functionality, but at least part of them should be tri- or more functional polyols and/or polyisocyanates.

A satisfactory internal three-dimensional crosslinked structure can be obtained by using a tri- or more functional ion-forming polyol (A) and/or tri- or more functional polyisocyanate (B) in a proportion of at least 0.1 mol %, preferably 0.2 ml % or more, still preferably 0.3 mol % or more, based on the total amount of components (A) and (B).

The terminology "three-dimensional crosslinked structure" as used herein is intended to mean a structure having a gel fraction of not less than 60%, preferably not less than 70%, still preferably not less than 90%, as measured by 24-hour immersion in acetone.

As the interfacial polymerization reaction between the polyisocyanate group in the organic phase and polyamine (C) proceeds, and thus the polyisocyanate group is consumed, the isocyanate equivalent approaches the hydroxyl equivalent in the inside of the particles. The internal crosslinking density further increases with the progress of urethanization, thereby further improving various physical properties of the dispersed particles, such as toughness and durability.

The organic phase, which is prepared based on such a design of mix, is then finely dispersed in an aqueous phase. Polyamine (C) is added thereto preferably in an amount of 0.2 to 1.0 equivalent, still preferably 0.3 to 1.0 equivalent, particularly preferably 0.4 to 0.9 equivalent, per equivalent of the excess isocyanate group present in the organic phase. Thus, urea formation is conducted on the interface of the particles, while the urethanization proceeds in the inside of the particles, thereby to obtain extremely tough finely dispersed polyurethane polyurea crosslinked particles.

The polyamine which is suitably used in the invention as component (C) includes conventional known diamines and polyamines, and mixtures thereof. Typical examples of polyamine (C) are 1,2-ethylenediamine, bis(3-aminopropyl)amine, hydrazine, hydrazine-2-ethanol, bis(2-methylaminoethyl)methylamine, 1,4-diaminocyclohexane, 3-amino-1-methylaminopropane, N-hydroxyethylethylenediamine, N-methyl-bis(3-aminopropyl)amine, tetraethylenediamine, hexamethylenediamine, 1-aminoethyl-1,2-ethylenediamine, bis(N,N'-aminoethyl)-1,2-ethylenediamine, diethylenetriamine, tetraethylenepentamine, pentaethylenehexamine, phenylenediamine, tolylenediamine, 2,4,6-triaminotoluene trihydrochloride, 1,3,6-triaminonaphthalene, isophorone diamine, xylylenediamine, hydrogenated xylylenediamine, 4,4'-diaminophenylmethane, hydrogenated 4,4'-diaminodiphenylmethane; silicone type polyamines, e.g., X-22-161-AS, X-22-161A, X-22-161B, X-22-161C (all produced by Shin-Etsu Chemical Co., Ltd.), and BY-16-828, BY-16-850, BY-16-8417, BY-16-849, BY-16-872 (all produced by Dow Corning Toray Silicone Co., Ltd.); and derivatives of a polyamine monomer, such as fluorine-containing polyamines, typically including compounds obtained by adding a perfluoroalkyl compound (e.g., perfluorooctyl chloride or perfluorooctyl sulforide) to a polyamine (e.g., diethylenetriamine). From the standpoint of weatherability, aliphatic and/or alicyclic polyamines are preferably used.

If desired, a non-reactive organic solvent can be added to the organic phase to be dispersed in an aqueous phase to decrease the viscosity and thereby to improve dispersibility in an aqueous phase. The organic solvent to be used can be selected from those inert to any of ion-forming polyol (A), polyisocyanate (B), an organometallic catalyst hereinafter described, and polyamine (C).

Examples of suitable inert solvents are esters, ethers, ketones, and aromatic or aliphatic hydrocarbons. Preferred of them are ethyl acetate, butyl acetate, methyl ethyl ketone, acetone, cyclohexanone, toluene, xylene, cyclohexane, methylcyclohexane, diphenyl ether, N-methyl-2-pyrrolidone, and mineral spirit. If desired, the organic solvent may be removed by heat treatment or treatment under reduced pressure or displaced with another solvent either during or after the formation of fine particles.

The aqueous phase in which the organic phase is dispersed may contain one or more compounds selected from nonionic, anionic or cationic surface active agents and protective colloids, such as polyvinyl alcohol, a hydroxyalkyl cellulose, a carboxyalkyl cellulose, gum arabic, a polyacrylate, polyacrylamide, polyvinylpyrrolidone, and an ethylene-maleic anhydride copolymer, but use of such a surface active agent or a protective colloid is unfavorable when water resistance is particularly demanded.

While the present invention is characterized by positive urethanization in the inside of the dispersed fine particles, the urethenation reaction of an isocyanate group with a hydroxyl group, as is well known, tends to slow to proceed as compared with urea formation with an amino group particularly when the isocyanate group is of aliphatic or alicyclic compound origin.

As is well known, since the reactivity of an isocyanate group to water is by far lower than to a hydroxyl group, and the shell formed by addition of polyamine (C) acts as a barrier, infiltration of water into the inside of the fine particles is negligible. Therefore, the purpose of carrying out urethanization inside the particles can be achieved simply by elevating the temperature while taking ample time, yet it is recommended to use an organometallic catalyst.

Organometallic catalysts generally employed for acceleration of reaction between an isocyanate group and a hydroxyl group, such as one or more of cobalt naphthenate, zinc naphthenate, stannous chloride, stannic chloride, tetra-n-butyltin, tri-n-butyltin acetate, n-butyltin trichloride, trimethyltin hydroxide, dimethyltin dichloride, dibutyltin diacetate, dibutyltin dilaurate, tin octenoate, and potassium oleate, can be used.

Where the organometallic catalyst is used in an amount of 5 to 10,000 ppm, preferably 10 to 5,000 ppm, still preferably 30 to 1,000 ppm, based on the organic phase, tough crosslinked fine particles can be formed within a much reduced time.

The catalyst may be added between the step of dispersing the organic phase in an aqueous phase and the step of adding polyamine (C). It is preferred to add the catalyst to the organic phase prior to finely dispersing the organic phase in an aqueous phase.

Addition of the catalyst to the organic phase before dispersing in an aqueous phase is preferred to addition after the dispersing. For the catalyst can be dispersed uniformly in the mixture of ion-forming polyol (A) and polyisocyanate (B) constituting the organic phase without undergoing influences of water, whereby the internal crosslinking occurs uniformly to produce finely dispersed polyurethane polyurea crosslinked particles of high quality.

Addition of the catalyst after addition of polyamine (C) is unfavorable because at that time the shell of the fine particles begins to be formed, and the catalyst is hardly taken into the inside of the particles, tending to reduce its activity in accelerating the internal urethanization.

According to the invention, the crosslinking density and the size of the finely dispersed polyurethane polyurea crosslinked particles can be designed and adjusted freely by proper selection of various conditions, such as the kind, amount or degree of neutralization of the ion-forming group of polyol (A), and the stirring speed or reaction temperature in the dispersing step.

The finely dispersed polyurethane polyurea crosslinked particles obtained by the invention usually have an average particle diameter of not greater than 1 $\mu$m as measured by a dynamic light scattering method, for example, with a particle size distribution measuring apparatus Photal LAP-3000/3100 manufactured by Otuka Electronics Co., Ltd,. In particular, those having an average particle diameter of 0.01 to 0.8 $\mu$m, preferably 0.05 to 0.5 $\mu$m, provide a film having excellent chemical resistance.

If the average particle diameter exceeds 1 $\mu$m, the dispersion of the crosslinked polyurethane polyurea fine particles has insufficient film-forming properties for providing a homogeneous coating film. The average particle diameter can be adjusted appropriately depending on the end use.

With the kinds or amounts of ion-forming polyol (A), polyisocyanate (B) and polyamine (C) being properly selected, the finely dispersed polyurethane polyurea crosslinked particles provide a film excellent in water resistance and solvent resistance even when used alone.

On the other hand, the finely dispersed polyurethane polyurea crosslinked particles of the invention may have a variety of core substances encapsulated therein. The core substance, which is added to the organic phase and taken into the inside of the polyurethane polyurea crosslinked particles, is not particularly limited and widely ranges in kind.

According to the process of the present invention, a core substance to be encapsulated in fine particles can previously be dispersed in ion-forming polyol (A) in the organic phase. Unlike the conventional process in which a core substance is directly dispersed in a prepolymer having an isocyanate group, the present invention is advantageous in that the core substance undergoes little influence of an isocyanate group or water and is therefore prevented from denaturation.

Further, because reduction of an isocyanate content of the isocyanate prepolymer due to the water content of a core substance does not occur, the range of core substances that can be encapsulated by the process of the invention is broader than that allowed by the conventional process of using an isocyanate-containing isocyanate prepolymer. It is possible therefore that the finely dispersed polyurethane polyurea crosslinked particles can have markedly improved quality and stability.

Typical examples of suitable core substances include not only chemicals or medicines, such as herbicides, bactericides, and insecticides, but perfumes, pigments, dyes, colorants, color formers, enzymes, detergents, catalysts, rust preventives, adhesives, chemically synthesized compounds, and food additives.

If desired, the finely dispersed polyurethane polyurea crosslinked particles can have encapsulated therein inert plasticizers, paraffins, animal or vegetable oils, silicone oils, or synthetic resins, such as a xylene resin or ketone resin, appropriately.

The process for producing the finely dispersed polyurethane polyurea crosslinked polymers is carried out as follows.

(a) An organic phase is prepared by mixing ion-forming polyol (A) and polyisocyanate (B) in the presence or absence of a non-reactive organic solvent at such a mixing ratio that the isocyanate group of polyisocyanate (B) is stoichiometrically in excess over the hydroxyl group of polyol (A). A tri- or more functional ion-forming polyol and/or a tri- or more functional polyisocyanate is/are used as component (A) and/or component (B). If desired, an organometallic catalyst is also mixed here.

(b) A dispersed layer is formed by slowly pouring the organic phase into an aqueous phase, while being stirred, and dispersing. The dispersing is preferably performed at about room temperature of from 10 to 35° C. for assuring stabilization of the disperse system. The dispersing can be effected with ease by means of an appropriate dispersing means, such as a propeller type general-purpose stirrer.

(c) Polyamine (C) is added to the dispersed layer while stirring at a temperature of 10 to 35° C. It is recommended to previously dilute polyamine (C) with water or an organic solvent to an effective concentration of 5 to 70%.

(d) Then the reaction temperature is raised to 40 to 95° C., preferably 50 to 90° C., still preferably 60 to 80° C., at which the dispersion is maintained usually for one to several hours to complete the reaction both at the shell and in the inside of the dispersed particles. Meantime the system is preferably stirred until a free isocyanate group is no more detected from the inside of the particles.

(e) If desired, the organic solvent, if used, is evaporated under reduced pressure or displaced with another solvent or water to give finely dispersed polyurethane polyurea crosslinked particles having an average particle diameter of not greater than 1 μm.

The present invention will now be illustrated in greater detail with reference to Reference Examples and Examples. Unless otherwise indicated, all the parts and percents are by weight.

REFERENCE EXAMPLE 1

Preparation of Ion-forming Polyol A:

In a flask were charged 62 parts of 2,2-dimethylolpropionic acid, 156 parts of isophorone diisocyanate, and 200 parts of ethyl acetate. The mixture was heated to 80° C. and maintained at that temperature for 4 hours while stirring in a nitrogen atmosphere. After a reduction in isocyanate content was no more observed, the temperature was dropped to 50° C., and 582 parts of polycaprolactonediol, Placcel 212 produced by Daicel Chemical Industries, Ltd. (average molecular weight: 1250) was poured therein, followed by allowing the mixture to react at 80° C. for 2 hours.

On confirming the isocyanate content reduction to 0% by infrared spectroscopic analysis (hereinafter referred to as IR analysis), there was obtained the desired resin having a nonvolatile content of 80%, a solution acid value of 26, a solution hydroxyl value of 26, and a Gardner viscosity (at 25° C.) of Z6. The resulting resin was designated PO-1.

REFERENCE EXAMPLE 2

In a flask were charged 40 parts of 2,2-dimethylolpropionic acid, 158 parts of hydrogenated 4,4'-diphenylmethane diisocyanate, and 200 parts of ethyl acetate. The mixture was heated to 80° C. and maintained at that temperature for 4 hours while stirring in a nitrogen atmosphere. After a reduction in isocyanate content was no more observed, the temperature was dropped to 50° C., and 602 parts of polycaprolactonediol, Placcel 210 produced by Daicel Chemical Industries, Ltd. (average molecular weight: 1000) was poured therein, followed by allowing the mixture to react at 80° C. for 2 hours.

On confirming the isocyanate content reduction to 0% by IR analysis, there was obtained a desired resin having a nonvolatile content of 80%, a solution acid value of 17, a solution hydroxyl value of 33, and a Gardner viscosity (at 25° C.) of X. The resulting resin was designated PO-2.

REFERENCE EXAMPLE 3

Styrene (250 parts), methyl methacrylate (157 parts), β-hydroxyethyl methacrylate (63 parts), methacrylic acid (30 parts), and t-butyl peroxyoctanoate Perbutyl O (produced by Nippon Oil and Fats Co., Ltd.) (8 parts) were mixed. In a flask were charged a 75-part portion of the mixture and 500 parts of methyl ethyl ketone (MEK) and stirred at 75° C. for 30 minutes in a nitrogen atmosphere. The rest of the mixture was then added thereto dropwise over a 2-hour period, and the dispersion was further reacted at that temperature for 12 hours to give a desired resin having a nonvolatile content of 50%, a solution acid value of 20, a solution hydroxyl value of 25, and a Gardner viscosity (at 25° C.) of Z. The resulting resin was designated PO-3.

REFERENCE EXAMPLE 4

Preparation of Non-ion-forming Polyol for Comparison:

In a flask were charged 49 parts of neopentyl glycol, 156 parts of isophorone diisocyanate, and 200 parts of ethyl acetate, and the mixture was heated to 80° C. and maintained at that temperature for 4 hours while stirring in a nitrogen atmosphere. After a reduction in isocyanate content was no more observed, the temperature was dropped to 50° C., and 592 parts of polycaprolactonediol, Placcel 212 produced by Daicel Chemical Industries, Ltd. (average molecular weight: 1250) was poured therein, followed by allowing the mixture to react at 80° C. for 2 hours.

On confirming the isocyanate content reduction to 0%, there was obtained a desired resin having a nonvolatile content of 80%, a solution acid value of 0, a solution hydroxyl value of 26, and a Gardner viscosity (at 25° C.) of V. The resulting resin was designated PO-4.

REFERENCE EXAMPLE 5

Preparation of Carboxyl-containing Isocyanate-terminated Prepolymer for Comparison:

In a flask were charged 454 parts of polytetramethylenediol (molecular weight: 2000), 36.9 parts of dimethylolpropionic acid, 167 parts of isophorone diisocyanate, 0.5 part of dibutyltin dilaurate, and 164 parts of N-methyl-2-pyrrolidone, and the mixture was stirred to react at 80° C. for 2 hours in a nitrogen atmosphere. The resulting resin, designated PI-4, had a nonvolatile content of 80% and an isocyanate content of 2.5%.

REFERENCE EXAMPLE 6

Preparation of Ion-forming Polyol (A):

In a flask were charged 123 parts of 1,6-hexanediol, 83 parts of neopentyl glycol, 424 parts of adipic acid, and 71 parts of 2,2-dimethylolpropionic acid, and the mixture was maintained at 150° C. for 2 hours. The mixture was then heated up to 230° C. over a 5-hour period, at which temperature the mixture was kept for 8 hours to conduct esterification. The temperature was dropped to 50° C., and 300 parts of MEK was added thereto to obtain a desired resin, designated PO-5, having a nonvolatile content of 70%, a solution acid value of 40, a solution hydroxyl value of 44, and a Gardner viscosity (at 25° C.) of Z2-Z3.

Polyisocyanate Compounds:

The following three kinds of polyisocyanate compounds were used.

PI-1: Solids content of Burnock DN-950, a hexamethylene diisocyanate adduct type polyisocyanate resin produced by Dainippon Ink & Chemicals, Inc.; isocyanate content: 16.8% (on solid basis).

PI-2: Burnock DN-980S, an isocyanurate type polyisocyanate resin prepared by using hexamethylene diisocyanate, produced by Dainippon Ink & Chemicals, Inc.; isocyanate content: 21.0%.

PI-3: Burnock Y6-572S, a polyester polyol adduct type polyisocyanate resin prepared by using hexamethylene diisocyanate, produced by Dainippon Ink & Chemicals, Inc.; isocyanate content: 10.4%

EXAMPLE 1

PO-1 (118 parts), 66 parts of PI-3, 0.1 part of dibutyltin dilaurate, and 143 parts of MEK were uniformly mixed to prepare an organic phase. The organic phase was slowly poured into an aqueous phase consisting of 651 parts of water and 6 parts of triethylamine (TEA) while stirring well by means of a stirrer to obtain a milky white dispersion.

A solution of 1.6 parts of hydrazine in 14 parts of water was slowly added to the dispersion, and the dispersion was stirred for 30 minutes and then kept at 80° C. for 1 hour. The dispersion was evaporated at that temperature under reduced pressure to remove ethyl acetate and MEK.

The resulting finely dispersed particles had a nonvolatile content of 30% and an average particle diameter of 0.06 μm as measured with Photal LAP-3000/3100, an apparatus for measuring particle size distribution by a dynamic light scattering method, produced by Otuka Electronics Co., Ltd. (hereinafter average particle diameters were measured in the same manner).

EXAMPLE 2

A milky white dispersion of fine particles having a nonvolatile content of 30% and a dispersed particle diameter of 0.08 μm was obtained in the same manner as in Example 1 except for using an organic phase consisting of 146 parts of PO-1, 41 parts of PI-2, 0.1 part of dibutyltin dilaurate and 136 parts of MEK, an aqueous phase consisting of 628 parts of water and 7.5 parts of TEA, 31 parts of water, and 3.5 parts of diethylenetriamine.

EXAMPLE 3

A milky white dispersion of fine particles having a nonvolatile content of 30% and a dispersed particle diameter of 0.12 μm was obtained in the same manner as in Example 1 except for using an organic phase consisting of 135 parts of PO-2, 49 parts of PI-2, 0.1 part of dibutyltin dilaurate and 139 parts of MEK, an aqueous phase consisting of 626 parts of water and 9 parts of TEA, 38 parts of water, and 4 parts of diethylenetriamine.

EXAMPLE 4

A milky white dispersion of fine particles having a nonvolatile content of 30% and a dispersed particle diameter of 0.1 μm was obtained in the same manner as in Example 1 except for using an organic phase consisting of 206 parts of PO-3, 59 parts of PI-1, 0.1 part of dibutyltin dilaurate and 63 parts of MEK, an aqueous phase consisting of 621 parts of water and 4 parts of TEA, 43 parts of water, and 4.7 parts of diethylenetriamine.

EXAMPLE 5

A milky white dispersion of fine particles having a nonvolatile content of 30% and a dispersed particle diameter of 0.09 μm was obtained in the same manner as in Example 1 except for using an organic phase consisting of 131 parts of PO-1, 55 parts of PI-2, 0.1 part of dibutyltin dilaurate and 140 parts of MEK, an aqueous phase consisting of 621 parts of water and 6.7 parts of TEA, 42 parts of water, and 4.7 parts of diethylenetriamine.

EXAMPLE 6

A milky white dispersion of fine particles having a nonvolatile content of 30% and a dispersed particle diameter of 0.15 μm was obtained in the same manner as in Example 1 except for using an organic phase consisting of 118 parts of PO-1, 66 parts of PI-2, 0.1 part of dibutyltin dilaurate and 142 parts of MEK, an aqueous phase consisting of 602 parts of water and 6 parts of TEA, 56 parts of water, and 8.5 parts of diethylenetriamine.

EXAMPLE 7

In a container that can be closed were charged 131 parts of PO-1, 24 parts of rutile titanium oxide Tipaque R-820 produced by Ishihara Sangyo Kaisha, Ltd., and 140 parts of MEK, and 200 parts of steel balls of 2 mm in diameter were put therein. The closed container was shaken in a paint conditioner for 1 hour to finely disperse titanium oxide.

After the steel balls were separated, 55 parts of PI-2 and 0.1 part of dibutyltin dilaurate were uniformly mixed with the resulting mill base to prepare an organic phase. The organic phase was slowly poured into an aqueous phase consisting of 621 parts of water and 6.7 parts of TEA while stirring well to obtain a milky white dispersion.

A solution of 4.7 parts of diethylenetriamine in 42 parts of water was slowly poured into the dispersion. The mixture was stirred for 30 minutes and then kept at 80° C. for 1 hour. Ethyl acetate and MEK in the dispersion were removed by evaporation under reduced pressure at that temperature to give a white dispersion of fine particles having a nonvolatile content of 34% and a dispersed particle diameter of 0.17 μm.

The above-prepared mill base of titanium oxide in PO-1 had remarkable stability, showing no change in viscosity when preserved at room temperature for 60 days. When finely dispersed particles were prepared in the same manner as described above except for using the mill base after 60 days' preservation, the resulting white dispersion had a nonvolatile content of 35% and a dispersed particle diameter of 0.17 μm, exhibiting remarkably excellent reproducibility.

EXAMPLE 8

PO-5 (137 parts), 11 parts of TEA, and 123 parts of MEK were uniformly mixed, and 58 parts of PI-2 and 0.1 part of dibutyltin dilaurate were uniformly mixed therewith to prepare an organic phase. The organic phase was poured into 644 parts of water while stirring well to obtain a milky white dispersion. A solution of 2.8 parts of hydrazine in 25 parts of water was poured into the dispersion. The mixture was stirred for 30 minutes and then kept at 80° C. for 1 hour. The solvent was removed by evaporation under reduced pressure at the same temperature to give a milky white dispersion of fine particles having a nonvolatile content of 30% and a dispersed particle diameter of 0.05 µm.

COMPARATIVE EXAMPLE 1

In an attempt to obtain fine particles having titanium oxide encapsulated in the same manner as in Example 7, 55 parts of PI-2, which is a polyisocyanate compound, 24 parts of Tipaque R-820, and 100 parts of MEK were previously put in a container that can be closed. Then, 200 parts of steel balls of 2 mm in diameter were put therein. The closed container was shaken in a paint conditioner for 1 hour to finely disperse titanium oxide.

The steel balls were separated, and the isocyanate content of PI-1 in the mill base was measured. The isocyanate content was found to be 4.9%, which was lower than that measured before dispersing the pigment, i.e., 6.4%, lending confirmation to the denaturation of PI-2.

On being preserved at room temperature for 60 days in a closed state, the mill base increased its viscosity to have stringiness.

COMPARATIVE EXAMPLE 2

In an attempt to obtain fine particles having titanium oxide encapsulated in the same manner as in Example 7, 140 parts of PI-4, which is a polyisocyanate compound, 20 parts of Tipaque R-820, and 140 parts of MEK were dispersed together with steel balls by shaking in a paint conditioner for 1 hour to finely disperse titanium oxide. After removal of the steel balls, the isocyanate content of the resulting mill base was found to be 0.9%, which was lower than that measured before dispersing the pigment, i.e., 1.2%, lending confirmation to the denaturation of PI-4.

On being preserved at room temperature for 60 days in a closed state, the mill base increased its viscosity.

COMPARATIVE EXAMPLE 3

PO-4 (147 parts), PI-2 (42 parts), dibutyltin dilaurate (0.1 part), and 10 parts of toluene were uniformly mixed to obtain an organic phase. The organic phase was slowly poured into an aqueous phase consisting of 760 parts of water and 0.63 part of partially saponified polyvinyl alcohol PVA-205 (produced by Kuraray Co., Ltd.) while stirring well at 7,000 to 7,500 rpm by means of a homomixer and dispersed by stirring for 1 minute to obtain a milky white dispersion.

The dispersion was transferred to another flask and stirred for 2 minutes in a paddle agitator at 2000 rpm. A solution of 3.6 parts of diethylenetriamine in 36 parts of water was added to the dispersion, followed by stirring at room temperature for 1 hour. After maintaining the dispersion at 80° C. for 1 hour, ethyl acetate and toluene were removed from the dispersion by evaporation under reduced pressure at that temperature to give finely dispersed particles having a nonvolatile content of 30% and a particle diameter as large as 3 µm.

The finely dispersed polyurethane polyurea crosslinked particles obtained in Examples 1 to 6 and 8 and Comparative Example 2 were compared in terms of various physical and performance properties, and the results obtained are shown in Table 1 below. The test items and methods for evaluation are as follows.

The samples for evaluation of resistance to ethyl acetate, water, alkali or acid were prepared by applying each dispersion of the polyurethane polyurea crosslinked particles to a steel plate to a dry thickness of about 20 µm, drying the coating film to set, and subjecting the film to heat treatment at 80° C. for 30 minutes to obtain a transparent film. The dispersion obtained in Comparative Example 1 had too low film-forming properties to be subjected to the evaluation testing.

Stability:
The particle dispersion to be tested was put in a 100 cc glass bottle and allowed to stand at 40° C. for 30 days. The sedimentation of the dispersion was observed with the naked eye and graded.

Ethyl Acetate Resistance:
The coating film was immersed in ethyl acetate for 24 hours, and the appearance was graded.

Water Resistance:
The coating film was immersed in boiling water for 2 hours, and the appearance was graded.

Alkali Resistance:
The coating film was immersed in a 5% aqueous solution of sodium hydroxide for 24 hours, and the appearance was graded.

Acid Resistance:
The coating film was immersed in a 5% aqueous solution of sulfuric acid for 24 hours, and the appearance was graded.

The standards for grading the results of evaluation are as follows.

A . . . No abnormality observed.
B . . . Little abnormality observed.
C . . . Slight abnormality observed.
D . . . Abnormality observed partially.
E . . . Considerable abnormality observed.

TABLE 1

| | | Resistance to: | | | |
|---|---|---|---|---|---|
| | Stability | Ethyl Acetate | Water | Alkali | Acid |
| Example 1 | A | A | A | B | C |
| Example 2 | A | A | A | A | B |
| Example 3 | A | A | A | B | B |
| Example 4 | A | A | A | B | C |
| Example 5 | A | A | A | A | A |
| Example 6 | A | A | A | A | A |
| Example 8 | A | A | A | B | B |
| Comparative Example 1 | E | — | — | — | — |

As is apparent from the results, the process for preparing finely dispersed polyurethane polyurea particles according to the invention makes it possible to disperse various core substances in a polyol component because of the use of ion-forming polyol (A) in the organic phase. Thus, denaturation of a core substance is more avoidable in the resulting polyurethane polyurea fine dispersion than in a polyurethane polyurea dispersion obtained by the conventional process in which a core substance is dispersed in an isocyanate-containing prepolymer. The present invention has additional advantages such that reduction of isocyanate content due to reaction with the water content of a core substance is suppressed; the workability in preparing a mill base is excellent; the mill base has excellent preservation stability; and ultrafine particles of a crosslinked polymer can be obtained with great ease without the aid of surface active agents or protective colloids. It would be easily understood from all these considerations that the finely dispersed polyurethane polyurea crosslinked particles of the invention provide a coating film excellent in water resistance, solvent resistance, and chemical resistance.

Effect of the Invention:

The present invention thus provides finely dispersed polyurethane polyurea crosslinked particles and a process for producing the same; the dispersed particles being firmly crosslinked and having an average particle diameter of not greater than 1 μm, and the particle dispersion having high preservation stability, preventing the core substance, if encapsulated therein, from undergoing denaturation, and exhibiting per se film-forming properties to provide a film excellent in water resistance, solvent resistance and chemical resistance.

While the invention has been described in detail and with reference to specific embodiments thereof, it will be apparent to one skilled in the art that various changes and modifications can be made therein without departing from the spirit and scope thereof.

What is claimed is:

1. A process for producing finely dispersed polyurethane polyurea crosslinked particles which comprises the steps of:
   (a) mixing (A) an ion-forming polyol and (B) a polyisocyanate at such a mixing ratio that the isocyanate group of (B) be in stoichiometrically excess over the hydroxyl group of (A) to prepare an organic phase;
   (b) dispersing said organic phase in an aqueous phase to form a dispersed layer; and
   (c) adding and dispersing (C) a polyamine to said dispersed layer to react wherein (A) the ion-forming polyol does not react with (b) the polyisocyanate in the steps (a) and (b), but (A) the ion-forming polyol reacts with (B) the polyisocyanate and (B) the polyisocyanate reacts with (C) the polyamine in the step (c).

2. A process for producing finely dispersed polyurethane polyurea crosslinked particles according to claim 1, wherein at least 0.1 mol % of the total of said polyol (A) and said polyisocyanate (B) is a tri- or more functional polyol and/or a tri- or more functional polyisocyanate.

3. A process for producing finely dispersed polyurethane polyurea crosslinked particles according to claim 1 or 2, wherein said organic phase is prepared by mixing said ion-forming polyol (A) and said polyisocyanate (B) in the presence of an inert organic solvent.

4. A process for producing finely dispersed polyurethane polyurea crosslinked particles according to any of claims 1 or 2, wherein said organic phase is prepared by mixing said ion-forming polyol (A) and said polyisocyanate (B) in the presence of an organometallic catalyst.

5. A process for producing finely dispersed polyurethane polyurea crosslinked particles according to any of claims 1 or 2, wherein said ion-forming polyol (A) is an ion-forming polyol containing a core substance.

6. A process for producing finely dispersed polyurethane polyurea crosslinked particles according to any of claims 1 or 2, wherein said ion-forming polyol (A) contains a carboxyl group in the molecule thereof.

7. A process for producing finely dispersed polyurethane polyurea crosslinked particles according to any of claims 1 or 2, wherein the equivalent ratio of said ion-forming polyol (A) to said polyisocyanate (B) ranges from 0.1:1 to 0.9:1.

8. A process for producing finely dispersed polyurethane polyurea crosslinked particles according to any of claims 1 or 2, wherein said ion-forming polyol (A) contains a carboxyl group in the molecule thereof and the equivalent ratio of said ion-forming polyol (A) to said polyisocyanate (B) ranges from 0.1:1 to 0.9:1.

9. A process for producing finely dispersed polyurethane polyurea crosslinked particles according to any of claims 1 or 2, wherein the equivalent ratio of said polyamine (C) to the excess isocyanate group present in said organic phase is 0.2 to 1.0.

10. A process for producing finely dispersed polyurethane polyurea crosslinked particles according to claim 6, wherein said carboxyl group in the molecule is in the form of a salt with a base.

11. Finely dispersed polyurethane polyurea crosslinked particles having an average particle diameter of not greater than 1 μm, which are prepared by the process according to any of claims 1 or 2.

12. Finely dispersed polyurethane polyurea crosslinked particles according to claim 11, wherein said particles have an average particle diameter of 0.01 to 0.5 μm.

13. Finely dispersed polyurethane polyurea crosslinked particles according to claim 11, wherein said particles have a core substance encapsulated therein.

* * * * *